United States Patent [19]
Fischer et al.

[11] Patent Number: 5,438,099
[45] Date of Patent: Aug. 1, 1995

[54] PARTICULATE GRAFT COPOLYMER AND THERMOPLASTIC MOLDING MATERIALS OBTAINED THEREFROM

[75] Inventors: Wolfgang Fischer, Ludwigshafen; Norbert Guentherberg, Speyer, both of Germany

[73] Assignee: BASF Aktiengesellschaft, Ludwigshafen, Germany

[21] Appl. No.: 165,465

[22] Filed: Dec. 13, 1993

[30] Foreign Application Priority Data

Dec. 16, 1992 [DE] Germany ............... 42 42 485.2

[51] Int. Cl.⁶ ............... C08L 51/04; C08F 291/02; C08F 265/04
[52] U.S. Cl. ............... 525/67; 525/68; 525/71; 525/73; 525/77; 525/78; 525/79; 525/279; 525/281; 525/287; 525/291; 525/293; 525/301; 525/303
[58] Field of Search ............... 525/67, 68, 71, 77, 525/78, 79, 279, 293, 301, 303, 281, 287, 291, 73

[56] References Cited

U.S. PATENT DOCUMENTS

| | | | |
|---|---|---|---|
| 3,055,859 | 9/1962 | Vollmert. | |
| 3,793,282 | 2/1974 | Fock et al. | 260/31.8 |
| 4,138,450 | 2/1979 | Fock | 525/303 |
| 4,612,347 | 9/1986 | Eichenauer et al. | 525/73 |
| 4,668,737 | 5/1987 | Eichenauer et al. | 525/73 |
| 5,252,666 | 10/1993 | Seitz | 525/306 |

FOREIGN PATENT DOCUMENTS

| | | |
|---|---|---|
| 450511 | 10/1991 | European Pat. Off. . |
| 1260135 | 2/1968 | Germany . |
| 3405938 | 8/1985 | Germany . |
| 3421353 | 12/1985 | Germany . |
| 1124911 | 8/1968 | United Kingdom . |

*Primary Examiner*—David Buttner
*Attorney, Agent, or Firm*—Keil & Weinkauf

[57] ABSTRACT

Abstract of the disclosure: A particulate graft copolymer comprises 30 to 90% by weight of at least one elastomeric grafting base A having a weight average particle size of from 30 to 1,000 nm comprising, based on A, 85 to 99.8% by weight of at least one alkyl acrylate A11 having 1 to 8 carbon atoms in the alkyl radical, 0.1 to 5% by weight of at least one polyfunctional, crosslinking monomer A12, and 0.1 to 10% by weight of at least one hydroxyalkyl acrylate or hydroxyalkyl methacrylate A13 or at least 50% by weight of one or more dienes A111, up to 50% by weight of one or more ethylenically unsaturated monomers A112, and 0.1 to 10% by weight of at least one hydroxyalkyl acrylate or hydroxyalkyl methacrylate A113 and 10 to 70% by weight of a graft sheath B comprising, based on B, up to 99.9% by weight of at least one aromatic vinyl monomer B1, up to 99.9% by weight of at least one polar, copolymerizable, ethylenically unsaturated monomer B2, and 0.1 to 20% by weight of at least one monomer B3 containing one or more basic or acid groups.

4 Claims, No Drawings

PARTICULATE GRAFT COPOLYMER AND THERMOPLASTIC MOLDING MATERIALS OBTAINED THEREFROM

The present invention relates to particulate graft copolymers and also to matt thermoplastic molding materials prepared therefrom, having improved toughness properties.

The preparation of particulate graft copolymers from a rubber-elastic core, ie. a polymer with a glass transition temperature of below 0° C., and a graft sheath, for example by emulsion polymerization, is known. For this purpose a grafting base is first of all prepared by emulsion polymerization of suitable monomers. The monomers that are to form the graft sheath are then polymerized in the presence of the grafting base in such a way that as large a proportion as possible is grafted onto the grafting base. The particulate graft copolymers are used to improve the impact resistance of intrinsically brittle and impact-sensitive thermoplastics. The monomers for the graft sheath are chosen so that the latter is compatible with the thermoplastic to be modified. The preparation of such impact modifiers has been known for a long time and is described for example in U.S. Pat. No. 3,055,859 and DE-C 1,260,135.

A basic problem in the preparation of such particulate graft copolymers is the bonding of the graft sheath to the grafting base. If the bonding is poor the impact-modifying action is inadequate, with the result that only products having a reduced toughness can be obtained. A number of measures have been proposed in order to improve the bonding. EP 0,450,511 describes an improvement of the bonding if a polymer that contains acidic group-containing monomers incorporated by polymerization is used as grafting base, and basic group-containing monomers are grafted thereon as graft sheath. Thermoplastic molding materials prepared from this have matt surfaces. The use of hydroxyalkyl acrylate or methacrylate in the grafting base is described as a further possibility in EP 0,445,601, though matt products are not obtained by this method.

The use of graft copolymers having acidic functions is described in DE 3,405,938 though only in combination with thermoplastic resins having basic functions. Although these polymer mixtures have matt surfaces, no improvement in the toughness is observed.

DE 3,421,353 describes graft copolymers in which acids or bases or acids and bases are simultaneously incorporated by polymerization into the graft sheath. However, this does not produce any improvement in toughness compared to the comparison polymers, whereas when the graft copolymers according to the invention described hereinafter are used, matt moldings having substantially improved toughness values are obtained.

We have found that molding materials having improved toughness are formed, ie. the bonding of the graft sheath to the grafting base can be substantially improved, if in addition to hydroxyalkyl acrylate or hydroxyalkyl methacrylate in the grafting base, 0.1 to 10 % by weight of basic or acidic monomers are incorporated by polymerization into the graft sheath. Molding materials containing the graft rubber according to the invention yield matt products having very good toughness properties even at relatively low rubber content; the graft rubber can be used as a flatting agent also in other compositions.

The immediate subject matter of the invention is a particulate graft copolymer comprising, based on the sum of A and B, A: 30 to 90% by weight of at least one elastomeric grafting base A having a median particle size of from 30 to 1,000 nm comprising, based on A, A11: 85 to 99.8% by weight of at least one alkyl acrylate A11 having 1 to 8 carbon atoms in the alkyl radical, A12: 0.1 to 5% by weight of at least one polyfunctional, crosslinking monomer A12, and A13: 0.1 to 10% by weight of at least one hydroxyalkyl acrylate or hydroxyalkyl methacrylate A13, or A111: at least 50% by weight of one or more dienes A111, A112: up to 50% by weight of one or more ethylenically unsaturated monomers A112, and A113: 0.1 to 10% by weight of at least one hydroxyalkyl acrylate or hydroxyalkyl methacrylate A113, and B: 10 to 70% by weight of a graft sheath B comprising, based on B, B1: up to 99.9% by weight of at least one aromatic vinyl monomer B1, B2: up to 99.9% by weight of at least one polar, copolymerizable, ethylenically unsaturated monomer B2, and B3: 0.1 to 20% by weight of at least one monomer B3 containing one or more basic or acidic groups.

The invention relates furthermore to a thermoplastic molding material that essentially comprises 1 to 50% by weight of the aforedescribed particulate graft copolymer and 50 to 99% by weight of at least one polymer having a glass transition temperature of more than 25° C. as matrix, and if desired minor amounts of conventional additives and auxiliaries. Such thermoplastic molding materials with matt surfaces are obtained by adding 1 to 50% by weight of the particulate graft copolymer according to the invention to impact-modified thermoplastics, for example ABS, ASA, impact-modified polystyrene (HIPS), polycarbonate/ABS, polycarbonate/ASA, polyphenylene ether/HIPS, impact-modified polymethyl methacrylate, impact-resistant PVC, and also their mixtures with one another.

Molding materials having matt surfaces are also obtained by using polymers from the class of polycarbonates, polyester carbonates, polyesters, polyamides, polyphenylene ethers, polyether ketones, polyether sulfones, polysulfones, polyoxylalkylenes, polyarylene sulfides, and also their mixtures with one another.

The invention thus relates to particulate graft copolymers of the above composition, which is governed by the preparation, and also to thermoplastic molding materials prepared using such graft copolymers. The following may be said in particular regarding the particulate graft copolymers according to the invention, their constituents and their preparation:

The particulate graft copolymers are obtained in a manner known per se from a grafting base (rubber) A and a graft sheath B. The rubber A is either a crosslinked acrylic acid ester polymer or a diene copolymer having a glass transition temperature below 0° C., preferably below −20° C.

Suitable monomers A11 are acrylic acid esters having 1 to 8 carbon atoms, at least in some cases those having 4 to 8 carbon atoms, in the alkyl radical. Particularly suitable monomers are n-butyl acrylate and ethylhexyl acrylate. The acrylic acid esters may in each case be used alone or also mixed with one another.

In order to obtain good mechanical properties it has proved necessary that the acrylic acid ester polymer used as grafting base is crosslinked. To this end the polymerization of the acrylic acid esters is carried out in the presence of from 0.1 to 5% by weight, based on the total weight of the monomers used in the preparation of the grafting base, of a copolymerizable, polyfunctional monomer A12 effecting the crosslinking. Suitable monomers are those containing at least two ethylenic double bonds not conjugated in the 1,3-position and capable of undergoing copolymerization. Examples include divinyl benzene, diallylmaleate, diallylfumarate, diallylphthalate, allylmethacrylate, triallylcyanurate or triallylisocyanurate. A particularly favorable crosslinking monomer has proved to be the acrylic acid ester of tricyclodecenyl alcohol (cf. DE-C 1,260,135).

The bonding of the graft sheath to the grafting base is considerably improved by 0.1 to 10% by weight of a hydroxyalkyl acrylate or hydroxyalkyl methacrylate A13 in combination with the monomer B3 of the graft sheath containing basic or acidic groups. Suitable hydroxyalkyl acrylates and methacrylates are esters of acrylic acid or methacrylic acid with polyhydric alcohols. Particularly preferred hydroxyalkyl acrylates contain 2 to 6 carbon atoms in the alkyl radical, for example 2-hydroxyethyl acrylate, 2-hydroxyethyl methacrylate and 4-hydroxybutyl acrylate.

The preparation of the graft copolymer can be carried out according to the method described in DE-C 1,260,135. To this end the grafting base A is first of all prepared; if the grafting base is to be an acrylate rubber, the acrylic acid ester or acrylic acid esters A11, the polyfunctional monomer A12 and the hydroxyalkyl acrylate or hydroxyalkyl methacrylate A13 are polymerized in aqueous emulsion at from 20° to 100° C., preferably from 50° to 80° C. Conventional emulsifiers such as the alkali metal salts of alkylarylsulfonic acids, alkyl sulfates, fatty alcohol sulfonates, salts of higher fatty acids having 10 to 30 carbon atoms or resin soaps may be used. Preference is given to the sodium salts of alkanesulfonates or of fatty acids having 10 to 18 carbon atoms. The emulsifiers are expediently used in an amount of from 0.5 to 5% by weight, in particular from 1 to 2 % by weight, based on the total weight of the monomers used for the preparation of the grafting base. In general, a water/monomer ratio of 2:1 to 0.7:1 is employed. Polymerization initiators include in particular the conventional persulfates, for example potassium peroxodisulfate; however, redox systems are also suitable. The amount of initiators (for example 0.1 to 1 % by weight, based on the total weight of the monomers) is governed in a known manner according to the desired molecular weight.

As polymerization auxiliaries there may be used the conventional buffer substances, for example sodium bicarbonate and sodium pyrophosphate, by means of which the pH is preferably adjusted to 6 to 9, and also up to 3% by weight of a molecular weight regulator such as mercaptan, terpinol, or dimeric alpha-methylstyrene.

The exact polymerization conditions, in particular the nature, metering and amount of the emulsifier, are determined within the aforementioned ranges so that the obtained latex of the crosslinked acrylic ester polymer has a $d_{50}$ value in the range from about 30 to 1,000 nm, preferably in the range from 50 to 800 nm. The $d_{50}$ value of the particle size is, as usual, defined as the weight average of the particle size as determined by means of an analytical ultracentrifuge corresponding to the method of W. Scholtan and H. Lange, Kolloid-Z. and Z.-Polymere 250 (1972) pp 782 to 796. The ultracentrifuge measurement provides the cumulative weight distribution of the particle diameter of a sample. From this it can be determined what percent by weight of the particles have a diameter equal to or less than a certain value. The median particle diameter, which is also termed the $d_{50}$ value of the cumulative weight distribution, is defined as the value at which 50% by weight of the particles have a smaller diameter, and 50 % by weight of the particles have a larger diameter, than the $d_{50}$ value.

If a diene rubber is to be the graft core, the following procedure is expediently adopted: the elastomer, the grafting base A is prepared by polymerizing A111 and A113 alone, if desired together with the further comonomers A112, in aqueous emulsion in a manner known per se at from 20° to 100° C., preferably from 50° to 80° C. Conventional emulsifiers, such as alkali metal salts of alkylsulfonic acids or alkylarylsulfonic acids, alkyl sulfates, fatty alcohol sulfonates, salts of higher fatty acids having 10 to 30 carbon atoms or resin soaps may be used. Preference is given to the sodium or potassium salts of alkanesulfonates or fatty acids having 10 to 18 carbon atoms. It is expedient to use the emulsifiers in amounts of from 0.5 to 5% by weight, in particular from 0.5 to 2% by weight, based on the monomers used in the preparation of the grafting base A. In general the polymerization is performed at a water to monomer ratio of from 2:1 to 0.7:1. As polymerization initiators there are used in particular the conventional persulfates, such as potassium persulfate, though redox systems may also be used. The initiators are generally used in amounts of from 0.1 to 1% weight, based on the monomers used in the preparation of grafting base A. Conventional buffer substances, for example sodium bicarbonate and sodium pyrophosphates, may be used, by means of which the pH is preferably adjusted to 6 to 9; furthermore, in general 0.1 to 3% by weight of a molecular weight regulator such as mercaptans, terpinols or dimeric alpha-methylstyrene may be used in the polymerization.

The exact polymerization conditions, in particular the type, metering and amount of the emulsifier are specifically selected within the aforementioned ranges so that the latex of the diene polymer A that is obtained has a $d_{50}$ value (see above) in the range from about 100 to 750 nm, preferably in the range from 100 to 600 nm. Alternatively, however, the emulsion polymer having average particle sizes in the range from 60 to 150 nm is agglomerated in a conventional manner (cf. DE-B 2,427,960).

In order to prepare the graft copolymer from the core and graft sheath, a monomer mixture comprising up to 99.9% by weight of at least one aromatic vinyl monomer B1, 0 to 99.9% by weight of at least one polar, copolymerizable monomer B2, and 0.1 to 20% by weight of at least one acidic or basic monomer B3 is polymerized in the presence of the obtained latex A. Examples of aromatic vinyl monomers are styrene, alpha-methylstyrene and nuclear-alkylated styrenes such as p-methylstyrene and tert-butylstyrene. Styrene, alpha-methylstyrene and p-methylstyrene are particularly preferred. Examples of polar, copolymerizable, ethylenically unsaturated monomers B2 are acrylonitrile, methacrylonitrile, and alkyl acrylates and alkyl methacrylates having 1 to 4 carbon atoms in the alkyl radical. Acrylonitrile, methylmethacrylate and mixtures thereof are preferred. In order further to improve the bonding of the graft sheath to the grafting base and to achieve the flatting effect, the monomer mixture used to prepare the graft sheath contains 0.1 to 20% by weight of one or more copolymerizable monomers that contain one or more acidic or basic groups (B3). Suitable acidic groups are in particular carboxylic acid or sulfonic acid groups. Preferred acidic monomers include alpha-beta unsaturated carboxylic acids such as acrylic acid or methacrylic acid, and also citraconic acid, crotonic acid, fumaric acid, iraconic acid, maleic acid, vinylsulfonic acid, vinylbenzenesulfonic acid, vinylphosphoric acids or cinnamic acid. Preferred monomers having basic groups contain a tertiary amino group in the molecule. Examples that may be mentioned here include dimethylaminoethyl (meth)acrylate, morpholinemethyl acrylate, n-vinylimidazole, p-dimethylaminostyrene, N-vinylcarbazole, N-vinylindole, N-vinylpyrrole, 4-vinylpyrimidine, 2-vinylpyridine, 3-vinylpyridine, 4-vinylpyridine, and their mixtures. Particularly preferred monomers are esters of acrylic acid or methacrylic acid with aliphatic alcohols that contain a tertiary amino group in the alkyl radical.

It is advantageous to carry out the graft copolymerization on the polymer serving as grafting base A again in aqueous emulsion. The copolymerization can be carried out in the same system as the polymerization of the grafting base, and further emulsifier and initiator may be added. The latter need not be identical to the emulsifiers or initiators used in the preparation of the grafting base A. For example, it may be expedient to use a persulfate as initiator for the preparation of the grafting base A, but to use a redox initiator system for the polymerization of the graft sheath B. The comments made in connection with the preparation of the grafting base A also apply as regards the choice of emulsifier, initiator and polymerization auxiliaries. The monomer mixture to be grafted on may be added to the reaction mixture in one go, batchwise in several stages, or preferably continuously during the polymerization. The graft copolymerization is regulated so as to produce a degree of grafting of from 10 to 60% by weight, preferably from 15 to 45% by weight.

The particulate graft copolymers according to the invention may be used alone as such as molding materials. To this end they may be processed for example by spray drying. Preferably however, the particulate graft copolymers are used in admixture with a thermoplastic in order to improve the impact resistance of the latter. Thermoplastics suitable for the modification have glass transition temperatures above 25° C., preferably above 60° C. Hereinafter they are also termed hard component (matrix). Examples of suitable hard components are polyvinyl chloride, polymethyl methacrylate and in particular copolymers of an aromatic vinyl monomer and a polar, copolymerizable, ethylenically unsaturated monomer. Suitable aromatic vinyl monomers and polar, copolymerizable, ethylenically unsaturated monomers are also those mentioned in the preparation of the graft sheath B1 and B2. Particularly preferred hard components are styrene-acrylonitrile copolymers and alpha-methylstyrene-acrylonitrile copolymers. The particulate graft copolymers according to the invention may be incorporated for example by separating the particulate graft copolymer from the emulsion by adding an electrolyte and then, if necessary after drying, mixing it with the hard component by co-extrusion, heading or rolling.

The thermoplastic molding materials according to the invention may contain, as further constituents, additives as are normally used for thermoplastic molding materials. As additives there may for example be mentioned fillers, further, compatible plastics, antistatics, antioxidants, flameproofing agents, lubricants, dyes and pigments. The additives are generally used in amounts of up to 30% by weight, based on the total weight of the thermoplastic molding material. Compatible plastics may also comprise a higher proportion.

The molding materials according to the invention can be processed by methods conventionally used for thermoplastics processing, for example extrusion and injection molding, into a very wide range of moldings, for example window profiles, garden furniture, boats, signboards and plates, lamp covers, automobile parts, electrical equipment housings and domestic appliance housings, and children's toys. The compositions according to the invention are particularly suitable for producing moldings in which high impact strength is required.

Parts and percentages are by weight unless otherwise specified.

EXAMPLES 1 AND 2 a) Preparation of a grafting base A

The following general procedure was adopted for the preparation of the respective grafting base based on acrylic esters (A11, A12, A13):

160 g of a monomer mixture specified in the table for the preparation of the grafting base A were heated in 1500 g of water to 60° C. while stirring, with the addition of 5 g of the sodium salt of a $C_{12}$–$C_{18}$-paraffinsulfonic acid, 3 g of potassium peroxodisulfate, 3 g of sodium bicarbonate and 1.5 g of sodium pyrophosphate. 10 Minutes after the start of the polymerization reaction, a further 840 g of the mixture given in the table were added within 3 hours. After the end of the monomer addition the emulsion was kept for 1 hour at 60° C.

b) Preparation of a particulate graft copolymer 2,100 g of the emulsion prepared according to the procedure a) were mixed with 1,150 g of water and 2.7 g of potassium peroxodisulfate and heated to 65° C. while stirring. After the reaction temperature was reached 560 g of the monomer mixture specified in the table for the preparation of the graft sheath B were metered in over 3 hours. After the end of the addition the emulsion was kept for 2 hours at 65° C. The graft copolymer was precipitated from the emulsion at 95° C. by adding calcium chloride solution, washed with water, and dried in a warm stream of air.

EXAMPLE 3 a) The respective grafting base based on butadiene (A111, A112, A113) was prepared according to the following procedure:

A polybutadiene latex is prepared at 65° C. by polymerizing 600 g of the monomer mixture A111, A112, A113 in the presence of a solution of 6 g of tert-dodecyl mercaptan, 7 g of $C_{14}$-Na-alkanesulfonate as emulsifier, 2 g of potassium peroxodisulfate and 2 g of sodium pyrophosphate in 800 ml of water. The conversion is 98%. A latex is obtained whose median particle size is 100 nm. The latex obtained is agglomerated by adding 25 g of an emulsion of a copolymer comprising 96 parts of ethylacrylate and 4 4 parts of methacrylamide having a solids content of 10% by weight, a polybutadiene latex having a median particle size of 350 nm being obtained.

b) Preparation of a particulate graft copolymer

After the addition of 400 g of water, 4 g of Na-C$_{14}$-alkanesulfonate and 2 g of potassium peroxodisulfate to the grafting base prepared according to the procedure 3b, 400 g of a mixture of styrene and acrylonitrile and the component B3 are added within 4 hours in the ratios specified in the table. The polymerization is performed by stirring the batch at 75° C. The conversion is practically quantitative, based on styrene-acrylonitrile. The graft rubber dispersion obtained is precipitated by adding magnesium sulfate solution and the separated graft copolymer is washed with distilled water and dried.

Molding material

In order to prepare the mixtures, a styrene/acrylonitrile copolymer having an acrylonitrile content of 35% and a viscosity number of 80 ml/g was used as matrix (hard component). The precipitated and dried graft copolymer (see examples) was mixed with the hard component in an extruder at 260° C., the resultant mixture in each case having a graft copolymer proportion of 30%. Molded parts were produced from this mixture by injection molding.

TABLE

| | Grafting base A[1] | | | Graft sheath B[2] | | | Notched impact strength at room temperature | |
|---|---|---|---|---|---|---|---|---|
| | BA | DCPA | HEA | S | AN | B3 | [kJ/m$^2$] | Gloss[3] |
| 1 | 96.5 | 2 | 1.5 | 74.7 | 24 | 1.3 DMAEA | 10.7 | 19 |
| 2 | 96.5 | 2 | 1.5 | 75 | 24 | 1.0 MAS | 11.2 | 20 |
| 3 | — | 99 | 1 | 70 | 29 | 1.0 MAS | 13 | 23 |
| C[4] | — | 100 Bu | — | 70 | 30 | — | 11 | 65 |
| C[4] | 96.5 | 2 | 1.5 | 75 | 25 | — | 6.4 | 62 |
| C[4] | 98 | 2 | — | 75 | 25 | — | 4.1 | 63 |
| C[4] | 97 | 2 | 1 MAS | 74 | 24 | 2 DMAEA | 8.7 | 21 |

[1])Composition of the monomer mixture used to prepare the grafting base A
[2])Composition of the monomer mixture used to prepare the graft sheath B
[3])45° Gloss
[4])Comparative tests corresponding to the state of the art
Bu = Butadiene
BA = Butyl acrylate
DCPA = Acrylic acid ester of tricyclodecenyl alcohol
DMAEA = Dimethylaminoethyl acrylate
HEA = 2-Hydroxyethyl acrylate
S = Styrene
AN = Acrylonitrile
MAS = Methacrylic acid

We claim:

1. A particulate graft copolymer comprising, based on the sum of A and B,

A: 30 to 90% by weight of at least one elastomeric grafting base A having a weight average particle size of from 30 to 1,000 nm comprising, based on A, A11: 85 to 99.8% by weight of at least one alkyl acrylate A11 having 1 to 8 carbon atoms in the alkyl radical, p'A12: 0.1 to 5% by weight of at least one polyfunctional, crosslinking monomer A12, and A13: 0.1 to 10% by weight of at least one hydroxyalkyl acrylate or hydroxyalkyl methacrylate A13, or A111: at least 50% by weight of one or more dienes A111, A112: up to 50% by weight of one or more ethylenically unsaturated monomers A112, and A113: 0.1 to 10% by weight of at least one hydroxyalkyl acrylate or hydroxyalkyl methacrylate A113, and B: 10 to 70% by weight of a graft sheath B comprising, based on B, B1: up to 99.9% by weight of at least one aromatic vinyl monomer B1, B2: up to 99.9% by weight of at least one polar, copolymerizable, ethylenically unsaturated monomer B2, and B3: 0.1 to 20% by weight of a monomer containing an acidic group selected from the group consisting of acrylic acid, methacrylic acid, citraconic acid, crotonic acid, fumaric acid, itaconic acid, maleic acid, vinylsulfonic acid, vinylbenzenesulfonic acid, vinylphosphoric acid, and cinnamic acid; or a basic group selected from the group consisting of dimethylaminoethyl (meth) acrylate, morpholinemethyl acrylate, n-vinyl-imidazole, p-dimethylaminostyrene, N-vinylcarbazole, N-vinylindole, N-vinylpyrrole, 4-vinylpyrimidine, 2-vinylpyridine, 3-vinylpyridine, and 4-vinylpyridine, and mixtures thereof.

2. A thermoplastic molding material essentially comprising 1 to 50% by weight of a particulate graft copolymer as claimed in claim 1 and 50 to 99% by weight of at least one polymer having a glass transition temperature of more than 25° C. as matrix, and if desired minor amounts of conventional additives and auxiliaries.

3. A process for preparing molding materials having matt surfaces, wherein 1 to 50% by weight of a particulate graft copolymer as claimed in claim 1 is added to an impact-modified thermoplastic selected from ABS, ASA, impact-modified polystyrene (HIPS), polycarbonate/ABS, polycarbonate/ASA, polyphenylene ether/HIPS, impact-modified polymethyl methacrylate, impact-resistant PVC, and also their mixtures with one another.

4. A particulate graft copolymer as defined in claim 1 wherein said monomer B3 comprises an acidic group selected from the consisting of acrylic acid, methacrylic acid, citraconic acid, crotonic acid, fumaric acid, itaconic acid, maleic acid, vinylsulfonic acid, vinylbenzenesulfonic acid, vinylphosphoric acid and cinnamic acid.

* * * * *